June 1, 1954   R. B. CLARK   2,679,790
AUTOMATIC CAMERA

Filed June 30, 1950   2 Sheets-Sheet 1

INVENTOR.
Robert B. Clark
BY
Bailey, Stephens & Huettig
ATTORNEYS

June 1, 1954  R. B. CLARK  2,679,790
AUTOMATIC CAMERA

Filed June 30, 1950  2 Sheets-Sheet 2

INVENTOR.
Robert B. Clark
BY
Bailey, Stephens & Huettig
ATTORNEYS

UNITED STATES PATENT OFFICE 2,679,790

AUTOMATIC CAMERA

Robert B. Clark, Washington, D. C., assignor to Hospital Picture Service Corporation, Cambridge, Mass., a corporation of Massachusetts Application June 30, 1950, Serial No. 171,279

1 Claim. (Cl. 95—31)

This invention relates to an automatic camera. In particular, the invention is directed to an electric camera which, upon the closing of a switch, will take a picture, and place a new film frame in position behind the shutter.

An object of the invention is to produce a camera particularly adapted to be used in hospitals for taking pictures of new born infants. Other objects are to produce a camera which is fully automatic upon closing of a foot switch, which will reset itself with a new film frame after the taking of a picture, which can have its film replaced easily by untrained personnel, and which will indicate the number of pictures taken on a film roll, and automatically cut itself off when the last picture frame on a film is used.

Generally, these objects of the invention are accomplished by having a motor driven film spool, the electric motor being connected in a circuit which, upon the closing of a switch, first actuates the camera shutter and a synchronized flash, or stroboscopic light, and simultaneously energizes the motor to move the film. The inertia in the motor and gear train is such that the picture is recorded on the film before the film begins to move. A metering roller in contact with the film operates a switch which keeps the motor operating to advance the film a predetermined length, and stops the motor when the new frame is in place. A solenoid operated ratchet counts and indicates the number of frames used, one upon each closing of the switch, and cuts the camera from the power supply when the final frame is used. By attaching the metering roll to the camera cover a simplicity of structure is obtained. Furthermore, an overrunning clutch shaft is provided in the drive shaft connecting the motor and the film spool so that the film may be wound manually independently of the motor.

The means by which the objects of the invention are obtained are described more fully in connection with the accompanying drawings, in which.

Figure 1:
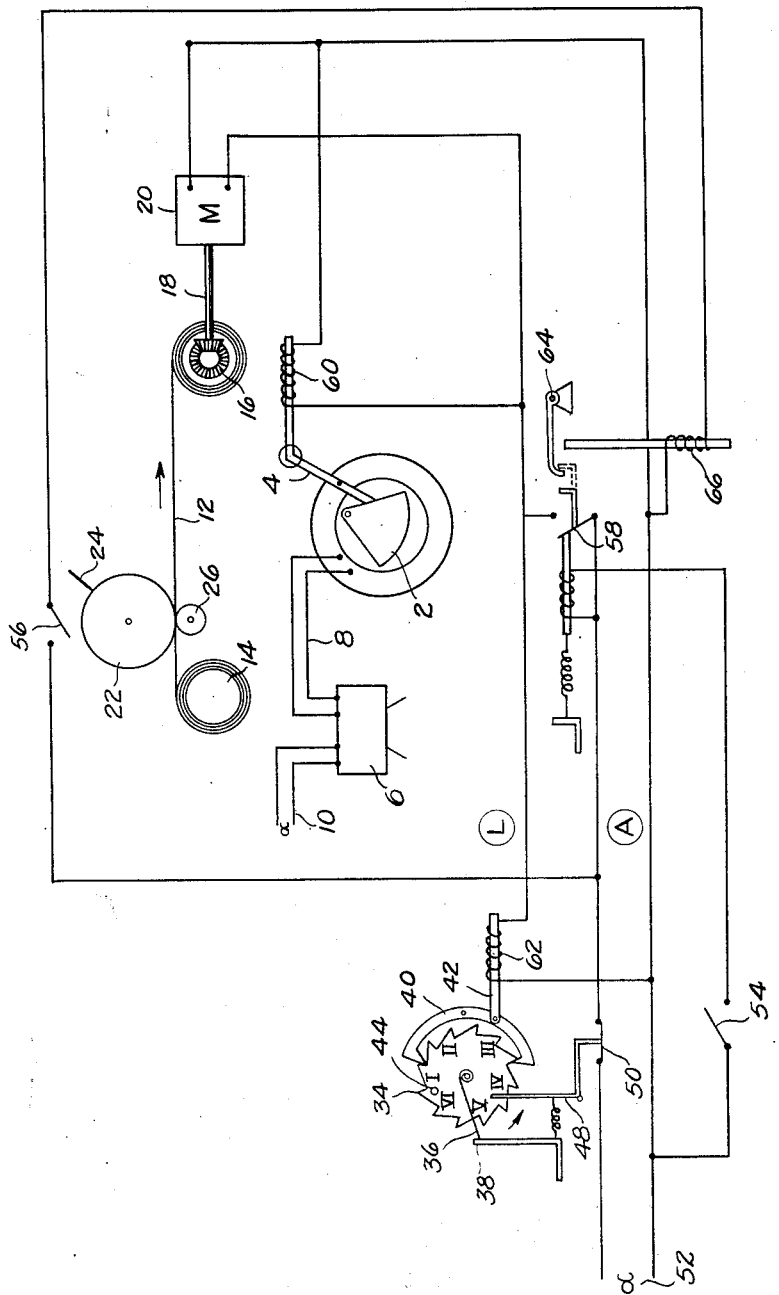
Figure 1 is a diagrammatic view of the camera operating elements connected in an electrical circuit.

In Figure 1, the camera shutter 2 is of conventional construction and has the usual actuating lever 4. Stroboscopic light 6 is connected to shutter 2 by a trigger circuit 8, the current source 10 for which also supplies light 6.

Photographic film 12 unwinds from spool 14 to spool 16, the latter being driven by shaft 18 connected to motor 20. Mounted above and resting on film 12 is a metering roll 22 provided with a projecting arm 24 adapted to strike and close a switch on each revolution. Pressure rolls 26 keep the film 12 tight against roll 22 so that film 12 rotates roll 22.

Figure 2:
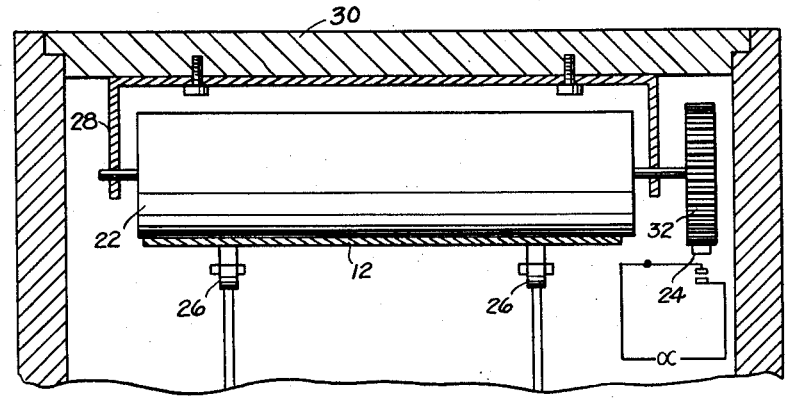
Figure 2 is a cross sectional view through the camera box showing the film meter roll.

As seen more clearly in Figure 2, meter roll is hung in a bracket 28 joined to the removable lid 30 of the camera box. Arm 24 extends from the periphery of a disc 32 of larger diameter than roll 22, and carried on the shaft supporting roll 22.

A counting indicator is composed of a ratchet wheel 34 having a coiled watch spring 36 on its axial shaft, the free end 38 of the spring being anchored to the camera casing. Pawl 40 constitutes an escape mechanism which is actuated by solenoid arm 42. Ratchet 34 carries a projection 44 adapted to strike lever 46 which in turn will open switch 50.

From current source 52, switch 50 is normally closed, and opened by ratchet 34 when all the frames in the film roll have been exposed. Meter roll switch 56 is normally open, and intermittently closed by roll 22.

Solenoid actuated switch 58 is normally open and connects the power source to solenoid 60 which actuates shutter lever 4. Switch 58 also connects the circuit with both solenoid 62 for operating escapement 40, and motor 20. The winding for the solenoid of switch 58 is shunted across the circuit, a manual, or foot, switch being included in the circuit side opposite that containing switch 50. Thus, when switch 54 is closed, the solenoid for switch 58 will be energized, switch 58 closed, and the motor 20 energized.

When switch 58 is closed, it is caught by latch 64, and held closed until latch 64 is released by being struck by the plunger of solenoid 66 which is in series with switch 56. In the meanwhile, as long as switch 58 is held closed by hook 64, motor 20 will continue to run even though switch 54 is open.

The operation of this mechanism is as follows: Film 14 is first wound from spool 14 to spool 16 until the first frame is in position behind the shutter, as is usual. Meter roll is set so that after the film is moved one frame, arm 24 will close switch 56. Ratchet 34 is manually turned to indicate the first frame, spring 36 being wound up. The camera being thus loaded, switch 54 is closed to take a picture.

Switch 50 being normally closed, solenoid switch 58 is closed and locked by latch 64. Solenoid 60 snaps shutter 2, and synchronized light 6 is flashed. Simultaneously solenoid 62 is energized and causes escapement 40 to release ratchet 34 so that it rotates to indicate the second picture frame, but switch 50 remains closed. Likewise, motor 20 is immediately energized, but by the time its inertia is overcome, the picture has been recorded on the stationary film 12. Movement of the film begins substantially immediately thereafter, the meter roll 22 being rotated in turn until arm 24 closes switch 56. Solenoid 66 is immediately energized, and its plunger strikes latch 64, releasing switch 58 which immediately opens and cuts the motor circuit. Solenoids 60 and 62 return to starting position.

The second frame on film 12 is now in position, and the picture taking cycle can be repeated by again closing switch 54. This cycle is repeated until the last frame on the film 12 has been used, after which the projection 44 on ratchet 34 strikes lever 48, thus opening switch 50 and opening the circuit. The camera is then reloaded and ratchet 34 rotated back to starting position.

Figure 3:
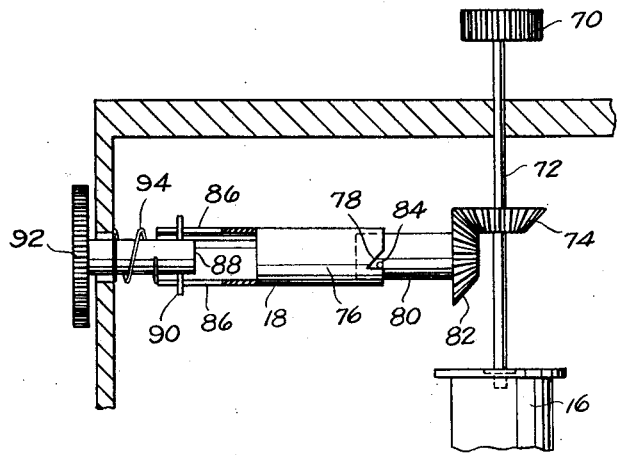
Figure 3 is an enlarged detail view, with parts broken away, of the film spool drive.

At times it is desirable to advance film 12 without operating the camera, and without the labor of turning the motor 20 and its associated gear train. In Figure 3, spool 16 is shown to be manually rotatable by knob 70 located on the outside of the camera casing and connected to the spool by shaft 72 carrying bevel gear 74. Motor drive shaft 18 is composed of a tubular member 76 having a notch 78 in its lower edge. This notch has one longitudinally extending edge, and one transversely sloping edge. Stub shaft 80 carries bevel gear 82 on one end in mesh with gear 74. The other end telescopes within shaft 76 and carries pin 84 which rests in notch 78. The upper end of shaft 76 has two longitudinally extending slots 86.

A second stub shaft 88 carries pin 90 which slidably projects through slots 86. Gear 92 joined to the upper end of shaft 88 is part of the gear train of motor 20. Spring 94 extending between the camera casing and the top end of shaft 76 urges shaft 86 downwardly.

When gear 92 is rotated, the longitudinal edge of notch 78 engages pin 84 and spool 16 is motor driven. When knob 70 is turned in the same directional sense, i. e. clockwise, spool 16 is manually rotated. Stub shaft 80 is likewise rotated, causing pin 84 to ride on the transversely inclined edge out of notch 78, thus lifting shaft 76 against the pressure of spring 94, pins 90 sliding in slots 86.

The camera is particularly adapted for the intermittent taking of pictures of objects placed at a predetermined focal distance, and the camera being operated by unskilled personnel. For example, the camera is widely used in hospitals for taking pictures of new born infants. The infant is placed on a shelf vertically beneath shutter 2, and in the light beam path of light 6. The nurse then has only to step on foot switch 54, whereupon the picture is instantly taken. Without further attention, the camera resets itself for another picture. As the meter roll 22 is connected to the camera case lid, it does not interfere with the loading of the camera with film.

A pair of cameras can be conveniently employed for simultaneously taking front and side views of persons for police records, and the like.

Having now described the means by which the objects of the invention are obtained, I claim:

In an automatic camera having a case, a removable cover for said case, a shutter, a lens for forming a picture in a focal plane, roll film passing through said focal plane and mounted on film spools, means for supporting said film between said rolls and an electric motor in driving connection with one of said spools, operating means comprising solenoid means for operating said shutter, means for simultaneously energizing said solenoid means and said motor, a metering roll connected to said lid and removable therewith, so as to make both it and said film readily accessible, said metering roll being mounted to engage frictionally and be movable by said film with said film being pressed between said metering roll and said supporting means, and means actuated by said metering roll for de-energizing said motor when said film has moved one picture frame.

References Cited in the file of this patent

UNITED STATES PATENTS

| Number | Name | Date |
|---|---|---|
| 2,232,240 | Jones | Feb. 18, 1941 |
| 2,282,075 | Mihalyi | May 5, 1942 |
| 2,360,255 | Mihalyi | Oct. 10, 1944 |
| 2,393,534 | Hineline | Jan. 22, 1946 |
| 2,530,758 | Cirone | Nov. 21, 1950 |
| 2,534,837 | Traversac | Dec. 19, 1950 |
| 2,552,250 | Bornemann et al. | May 8, 1951 |

FOREIGN PATENTS

| Number | Country | Date |
|---|---|---|
| 557,050 | Great Britain | Nov. 2, 1943 |